(12) United States Patent
Vandike et al.

(10) Patent No.: US 12,406,387 B2
(45) Date of Patent: Sep. 2, 2025

(54) CROP RESIDUE BASED FIELD OPERATION ADJUSTMENT

(71) Applicant: Deere & Company, Moline, IL (US)

(72) Inventors: Nathan R. Vandike, Geneseo, IL (US); Brian J. Gilmore, Davenport, IA (US); Dinesh V. Phatak, Pune (IN); David L. Wells, Bettendorf, IA (US); Mahesh S. Bothe, Kopargaon (IN)

(73) Assignee: Deere & Company, Moline, IL (US)

( * ) Notice: Subject to any disclaimer, the term of this patent is extended or adjusted under 35 U.S.C. 154(b) by 254 days.

(21) Appl. No.: 17/945,407

(22) Filed: Sep. 15, 2022

(65) Prior Publication Data

US 2023/0017658 A1    Jan. 19, 2023

Related U.S. Application Data

(63) Continuation of application No. 16/517,482, filed on Jul. 19, 2019, now Pat. No. 11,510,364.

(51) Int. Cl.
| | |
|---|---|
| *G06T 7/60* | (2017.01) |
| *A01B 79/00* | (2006.01) |
| *A01D 41/127* | (2006.01) |
| *G06T 7/00* | (2017.01) |
| *G06V 10/44* | (2022.01) |
| *G06V 10/82* | (2022.01) |

(Continued)

(52) U.S. Cl.
CPC ............ *G06T 7/60* (2013.01); *A01B 79/005* (2013.01); *A01D 41/127* (2013.01); *G06T 7/0002* (2013.01); *G06V 10/454* (2022.01); *G06V 10/82* (2022.01); *G06V 20/56* (2022.01); *G06T 2207/20081* (2013.01); *G06T 2207/20084* (2013.01); *G06T 2207/30128* (2013.01); *G06T 2207/30188* (2013.01); *G06T 2207/30242* (2013.01); *G06V 20/20* (2022.01); *G06V 20/68* (2022.01)

(58) Field of Classification Search
CPC ................... G06T 7/60; G06T 7/0002; G06T 2207/20081; G06T 2207/20084; G06T 2207/30128; G06T 2207/30188; G06T 2207/30242; A01B 79/005; A01D 41/127; A01D 41/1243; A01D 41/12; G06V 10/454; G06V 10/82; G06V 20/56; G06V 20/68
USPC ......................................................... 701/50
See application file for complete search history.

(56) References Cited

U.S. PATENT DOCUMENTS

| | | |
|---|---|---|
| 6,406,368 B1 | 6/2002 | Cruson et al. |
| 6,591,145 B1 | 7/2003 | Hoskinson et al. |

(Continued)

FOREIGN PATENT DOCUMENTS

| | | |
|---|---|---|
| BR | 102021011709 A2 | 12/2022 |
| CN | 105875030 A | 8/2016 |

(Continued)

*Primary Examiner* — Tiffany P Young
*Assistant Examiner* — Leah N Miller
(74) *Attorney, Agent, or Firm* — Taft Stettinius & Hollister LLP; Stephen F. Rost

(57) ABSTRACT

A crop residue monitoring system may include a harvester, a camera to capture an image of crop residue generated by the harvester, an analytical unit to derive a value for a crop residue parameter of the crop residue based upon an optical analysis of the image and a control unit to adjust a subsequent field operation based upon the value of the crop residue parameter.

20 Claims, 4 Drawing Sheets

(51) Int. Cl.
  *G06V 20/56* (2022.01)
  *G06V 20/20* (2022.01)
  *G06V 20/68* (2022.01)

(56) References Cited

U.S. PATENT DOCUMENTS

| | | | |
|---|---|---|---|
| 6,939,221 | B1 | 9/2005 | Redekop et al. |
| 7,467,997 | B2 | 12/2008 | Niermann et al. |
| 7,485,035 | B1 | 2/2009 | Yde |
| 7,861,606 | B2 * | 1/2011 | Kormann ............. A01D 41/127 |
| | | | 73/863.52 |
| 9,568,438 | B1 * | 2/2017 | Kim ....................... G01N 21/85 |
| 9,600,872 | B2 | 3/2017 | Dima |
| 10,262,206 | B2 | 4/2019 | Posselius |
| 2003/0187560 | A1 | 10/2003 | Keller et al. |
| 2003/0190939 | A1 | 10/2003 | Bueermann |
| 2005/0059445 | A1 | 3/2005 | Niermann et al. |
| 2005/0194473 | A1 | 9/2005 | Pearson et al. |
| 2006/0183519 | A1 | 8/2006 | Benes |
| 2007/0026912 | A1 | 2/2007 | Anderson et al. |
| 2007/0111766 | A1 | 5/2007 | Holmen |
| 2007/0275775 | A1 | 11/2007 | Farley et al. |
| 2008/0268927 | A1 | 10/2008 | Farley et al. |
| 2009/0005137 | A1 | 1/2009 | Isaac et al. |
| 2009/0111548 | A1 | 4/2009 | Landuyt |
| 2009/0253474 | A1 | 10/2009 | Isaac |
| 2009/0287380 | A1 | 11/2009 | Chervenka et al. |
| 2009/0325659 | A1 | 12/2009 | Overschelde et al. |
| 2011/0045883 | A1 | 2/2011 | Weichholdt et al. |
| 2011/0045884 | A1 | 2/2011 | Weichholdt et al. |
| 2011/0093169 | A1 | 4/2011 | Schroeder et al. |
| 2011/0130181 | A1 | 6/2011 | Roberge et al. |
| 2011/0237316 | A1 | 9/2011 | Isaac et al. |
| 2011/0270495 | A1 | 11/2011 | Knapp |
| 2012/0178509 | A1 | 7/2012 | Eggenhaus et al. |
| 2012/0262568 | A1 * | 10/2012 | Ruthenberg ......... A01B 69/001 |
| | | | 348/148 |
| 2012/0270613 | A1 | 10/2012 | Isaac et al. |
| 2013/0095899 | A1 | 4/2013 | Knapp |
| 2013/0324199 | A1 | 12/2013 | Roberge et al. |
| 2014/0031096 | A1 | 1/2014 | Isaac et al. |
| 2014/0080555 | A1 | 3/2014 | Wagner et al. |
| 2014/0171160 | A1 | 6/2014 | Ricketts et al. |
| 2014/0302897 | A1 | 10/2014 | Isaac et al. |
| 2015/0264864 | A1 | 9/2015 | Branch et al. |
| 2015/0348419 | A1 | 12/2015 | Matthews |
| 2015/0351321 | A1 | 12/2015 | Shane |
| 2015/0373913 | A1 | 12/2015 | Berry |
| 2016/0088794 | A1 * | 3/2016 | Baumgarten ........ A01D 41/127 |
| | | | 460/1 |
| 2016/0374267 | A1 | 12/2016 | Reinecke et al. |
| 2017/0034997 | A1 | 2/2017 | Mayerle |
| 2017/0071125 | A1 | 3/2017 | Pfeiffer et al. |
| 2017/0086372 | A1 | 3/2017 | Palla et al. |
| 2017/0086373 | A1 | 3/2017 | Mahieu et al. |
| 2017/0112055 | A1 | 4/2017 | Depreitere et al. |
| 2017/0118914 | A1 * | 5/2017 | Bruns .................... A01D 90/10 |
| 2017/0142900 | A1 | 5/2017 | Mahieu et al. |
| 2017/0238463 | A1 | 8/2017 | Van De Wege et al. |
| 2018/0007831 | A1 | 1/2018 | Ballegeer et al. |
| 2018/0084718 | A1 | 3/2018 | Baumgarten et al. |
| 2018/0092301 | A1 | 4/2018 | Vandike et al. |
| 2018/0092302 | A1 | 4/2018 | Vandike et al. |
| 2018/0303030 | A1 * | 10/2018 | Heitmann ............ A01D 43/085 |
| 2018/0310474 | A1 * | 11/2018 | Posselius ............. A01D 41/127 |
| 2018/0368318 | A1 | 12/2018 | Isaac et al. |
| 2019/0104681 | A1 | 4/2019 | Larson et al. |
| 2019/0174674 | A1 | 6/2019 | Diessner et al. |
| 2019/0392269 | A1 * | 12/2019 | Ferrari .............. G06V 30/19173 |
| 2020/0060082 | A1 | 2/2020 | Shinners et al. |
| 2020/0107502 | A1 | 4/2020 | Mayerle et al. |
| 2020/0120869 | A1 * | 4/2020 | Vandike ................. H04N 23/90 |
| 2020/0296896 | A1 | 9/2020 | Mayerle |
| 2020/0323133 | A1 | 10/2020 | Anderson et al. |
| 2020/0396904 | A1 | 12/2020 | Faulkner et al. |
| 2021/0015039 | A1 | 1/2021 | Vandike et al. |
| 2021/0034867 | A1 | 2/2021 | Ferrari et al. |
| 2021/0282329 | A1 | 9/2021 | Hall |
| 2021/0400870 | A1 | 12/2021 | Sunil et al. |
| 2022/0110253 | A1 | 4/2022 | Anderson et al. |
| 2022/0132742 | A1 | 5/2022 | Faulkner et al. |
| 2022/0174873 | A1 | 6/2022 | Topmoller et al. |
| 2022/0232768 | A1 | 7/2022 | Craig |
| 2022/0346313 | A1 | 11/2022 | Passchyn et al. |
| 2022/0354054 | A1 | 11/2022 | Hermann |
| 2022/0361411 | A1 | 11/2022 | Mayerle et al. |
| 2022/0361412 | A1 | 11/2022 | Duquesne et al. |
| 2022/0369552 | A1 | 11/2022 | Christiansen et al. |
| 2022/0369553 | A1 | 11/2022 | Christiansen et al. |
| 2022/0369554 | A1 | 11/2022 | Christiansen et al. |
| 2022/0375228 | A1 | 11/2022 | Christiansen et al. |
| 2022/0394921 | A1 | 12/2022 | Missotten et al. |
| 2022/0394923 | A1 | 12/2022 | Christiansen et al. |
| 2022/0394924 | A1 | 12/2022 | Christiansen et al. |
| 2022/0394925 | A1 | 12/2022 | Missotten et al. |
| 2022/0394926 | A1 * | 12/2022 | Missotten .......... A01D 41/1243 |
| 2022/0397417 | A1 | 12/2022 | Christiansen et al. |
| 2022/0408642 | A1 | 12/2022 | Bojsen |
| 2023/0026898 | A1 | 1/2023 | Baes et al. |
| 2023/0028281 | A1 | 1/2023 | Lorriette |
| 2023/0037095 | A1 | 2/2023 | Mayerle |

FOREIGN PATENT DOCUMENTS

| | | | |
|---|---|---|---|
| CN | 107886077 A | 4/2018 | |
| CN | 107886123 A | 4/2018 | |
| CN | 108093830 A | 6/2018 | |
| DE | 102014005904 A1 | 10/2015 | |
| DE | 102014014049 A1 | 3/2016 | |
| EP | 264764 A2 | 4/1988 | |
| EP | 0685151 A1 | 12/1995 | |
| EP | 1790207 B1 | 5/2007 | |
| EP | 1856966 B1 | 11/2007 | |
| EP | 1964465 A2 | 9/2008 | |
| EP | 2098109 A1 * | 9/2009 | ........... A01D 43/085 |
| EP | 2364587 A1 | 9/2011 | |
| EP | 2452550 A1 * | 5/2012 | ........... A01D 43/085 |
| EP | 2936962 B1 | 10/2015 | |
| EP | 3172959 A1 | 5/2017 | |
| EP | 2936961 B1 | 8/2018 | |
| EP | 3172959 B1 | 9/2018 | |
| EP | 3228174 B1 | 3/2019 | |
| EP | 3000302 B1 | 8/2019 | |
| EP | 3613272 A1 | 2/2020 | |
| EP | 4000373 A1 | 5/2022 | |
| EP | 1266553 A2 | 12/2022 | |
| EP | 4115723 A1 | 1/2023 | |
| EP | 4129044 A1 | 2/2023 | |
| GB | 2606740 A1 | 11/2022 | |
| GB | 2606741 A | 11/2022 | |
| IN | 202011006479 A | 8/2021 | |
| RU | 2149530 C1 | 5/2000 | |
| WO | 03005803 A1 | 1/2003 | |
| WO | 03039238 A1 | 5/2003 | |
| WO | 2017075002 A1 | 5/2017 | |
| WO | 18076428 A1 | 5/2018 | |
| WO | 18162699 A1 | 9/2018 | |
| WO | WO-2018162699 A1 * | 9/2018 | ......... A01D 41/1243 |
| WO | 2018235486 A1 | 12/2018 | |
| WO | 2022243785 A1 | 11/2022 | |
| WO | 2022243786 A1 | 11/2022 | |

* cited by examiner

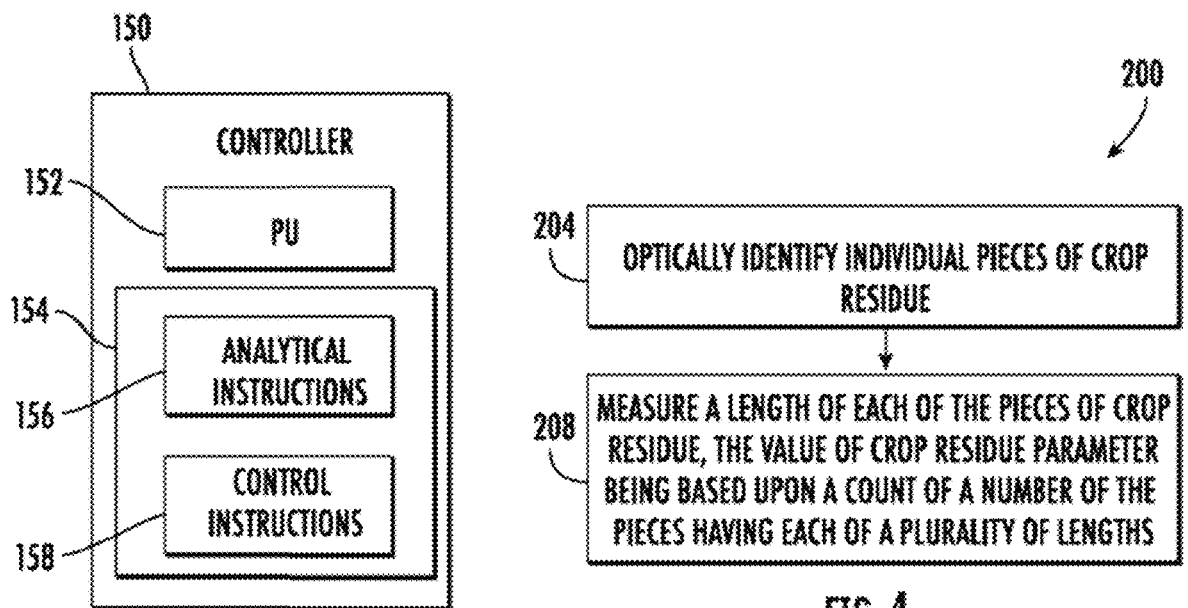
FIG. 3
FIG. 4
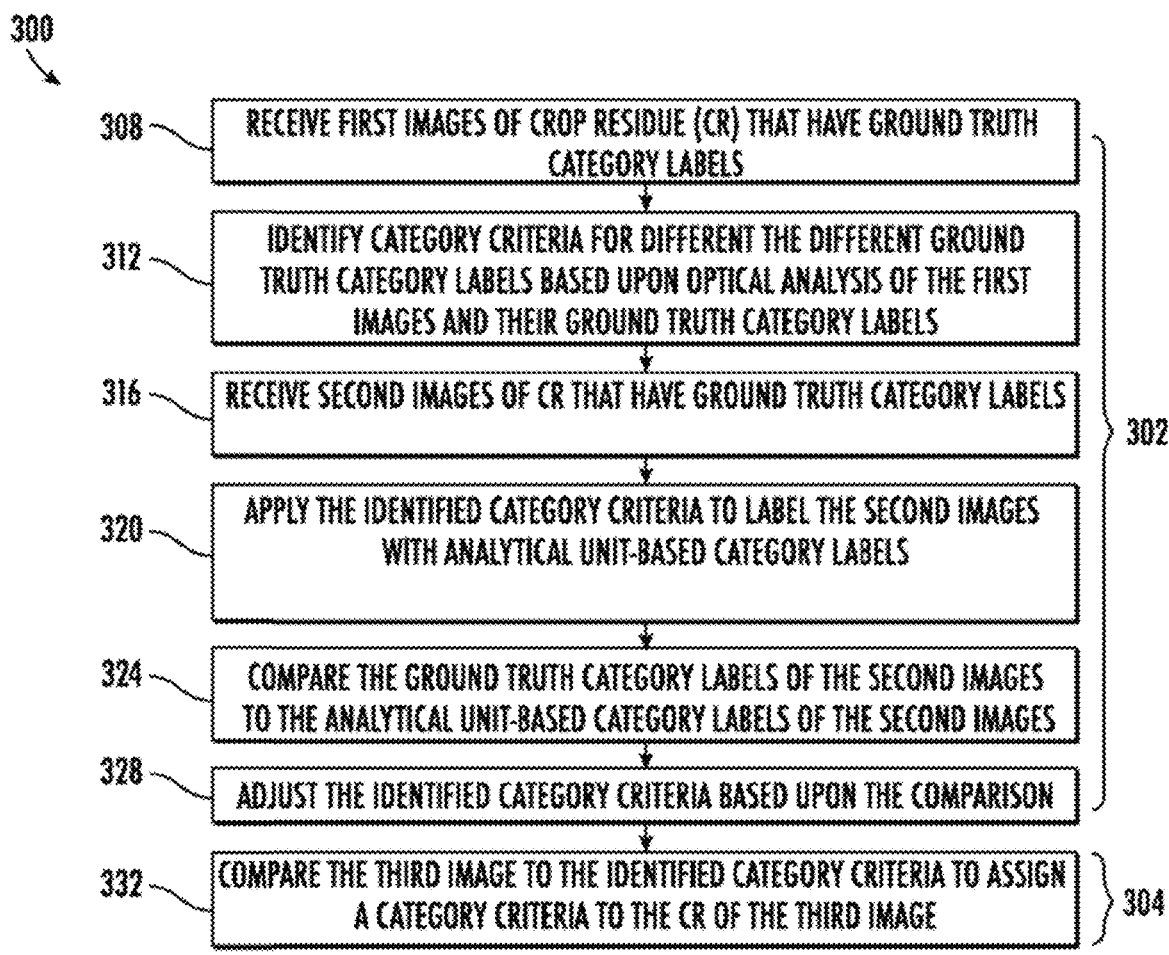
FIG. 5

CROP RESIDUE BASED FIELD OPERATION ADJUSTMENT

RELATED APPLICATIONS

This application is a continuation of U.S. patent application Ser. No. 16/517,482, filed Jul. 19, 2019, the disclosure of which is hereby incorporated by reference in its entirety.

BACKGROUND

Crop residue is a byproduct of a crop harvesting operation. Crop residue may include straw, chaff or other unwanted portions of a crop plant following threshing and/or separation processes by a harvester. Crop residue may additionally include other biomass such as weeds, weed seeds and the like. Such residue is often discharged from the harvester.

BRIEF DESCRIPTION OF THE DRAWINGS

FIG. 3 is a block diagram of an example controller for monitoring crop residue.

FIG. 4 is a flow diagram of an example method for deriving values for a crop residue parameter based upon captured images of crop residue.

FIG. 5 is a flow diagram of an example method for deriving values for a crop residue parameter based upon captured images of crop residue.

Figure 1:
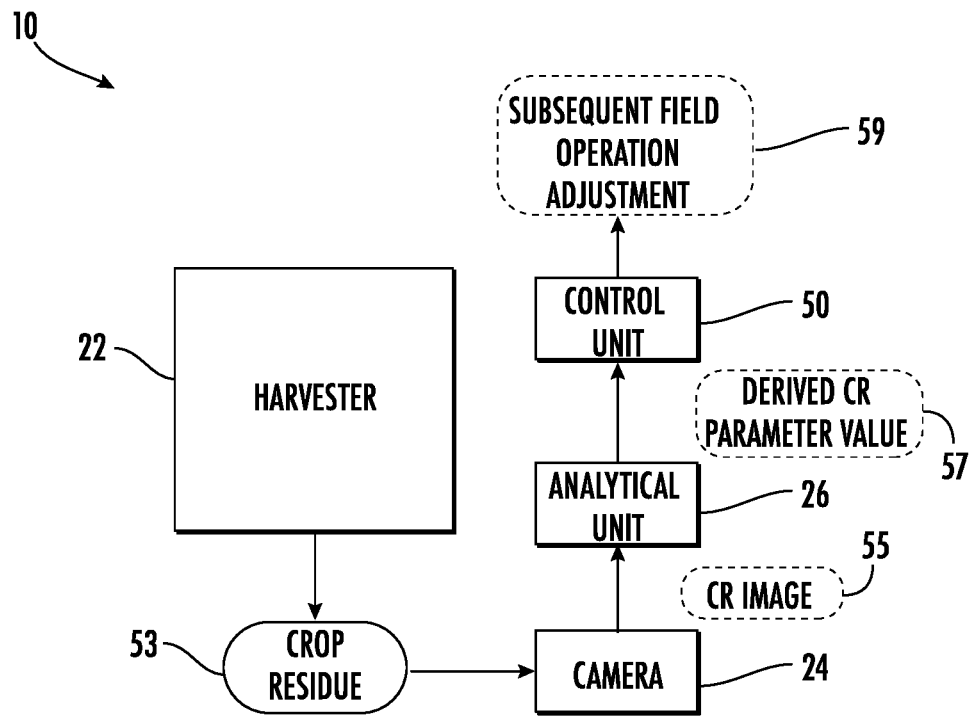
FIG. 1 schematically illustrates portions of an example crop residue monitoring system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example crop residue monitoring systems, methods and machine-readable mediums that monitor crop residue generated by a harvester and use such information to adjust subsequent field operations. The disclosed systems, methods and mediums may utilize a camera to capture an image of the crop residue generated by the harvester. An analytical unit derives a value for the crop residue parameter of the crop residue based upon an optical analysis of the image. A control unit utilizes the value of the crop residue parameter to adjust a subsequent field operation. As a result, the subsequent field operations may be more attuned to the current crop residue conditions.

In some implementations where the crop residue being analyzed is crop residue that has already been discharged from the harvester, the camera used to capture the image of the crop residue may be that of a satellite, drone, tillage machine or other platform distinct from the harvester generating the crop residue. The camera may be of various types including, but not limited to, an optical camera, a thermal imaging camera, a radar-based camera, a hyperspectral camera and a light imaging detection and radiation (LIDAR) camera. In some implementations, the camera used to capture the image of the crop residue, prior to discharge or after discharge from the harvester, is carried by the harvester itself. In one implementation, the camera is supported so as to capture images of the crop residue prior to discharge of the crop residue from the harvester. For example, in some implementations, the camera may be located so as to capture images of the crop residue as it is being blown from a sieve or chaffer towards a rear residue spreader of the harvester. In some implementations, camera may be located so as to capture images of the crop residue as it is being directed from a straw walker or threshing rotor towards a rear residue spreader of the harvester. In some implementations, the camera may be located such to capture images of the crop residue after is undergone chopping, but before being spread by the rear residue spreader of the harvester. In yet other implementations, the camera may be located so as capture images of the crop residue after the crop residue has been discharged. In some implementations, multiple cameras may be utilized to capture images of the crop residue more than one of the above described locations or stages.

In implementations where images of the crop residue are captured at multiple different stages or locations, the controller derive multiple values for the crop residue parameter at the different stages. In some implementations, different subsequent field operations may be adjusted based upon the value of the crop residue parameter at different stages. For example, the controller may adjust a first subsequent field operation based upon the value of the crop residue parameter at a first stage or location and may adjust a second different subsequent field operation based upon the value of the crop residue parameter at a second stage or location. In some implementations, the controller may adjust a subsequent field operation based upon an aggregation of values for the crop residue parameter taken at different stages or locations. In some implementations, the controller may apply different predetermined or operator selected weightings to the different crop residue parameter values taken at the different stages or locations.

In some implementations, the controller may utilize the derived values for the crop residue parameter to generate a field map linking different derived values to different geo-referenced locations in a field. The field map may be stored. The stored field map may be consulted to adjust subsequent field operations at the different geo-referenced locations in the field.

In one implementation, the subsequent field operations adjusted by the controller or adjusted by controller using the generated field map may comprise subsequent operations to the same geo-referenced regions by different agricultural machines other than the harvester. For example, subsequent tillage settings for tillage machines may be adjusted based upon the value of the crop residue parameter. Subsequent spraying or planting operations may be adjusted based upon the value of the crop residue parameter at different geo-referenced locations or regions.

In some implementations, the settings of the agricultural machine may remain the same, but the parameter of a subsequent applied material may be adjusted based upon the value of the crop residue parameter. For example, a type, density or other characteristic of seed, of applied herbicide, of applied insecticide, of applied fertilizer or of other applied materials may be adjusted based upon the value of the crop residue parameter.

In yet other implementations, the operational settings of the harvester itself during a subsequent harvesting season, during the same harvesting season or during traversal of the harvester across the same field may be adjusted based upon the value of the crop residue parameter. For example, operational settings of the harvester itself minutes or hours after the value for the crop residue parameter value has been derived, while harvester is traversing the same field, may be adjusted based upon the derived crop residue parameter value. Examples of such operations settings include, but are not limited to, chopper speed, chopper power, harvester speed, harvester feed rate, chopper counter knife position, header height, spreader speeds, spreader vein positions, threshing speed, cleaning speed, threshing clearance, separator discharge vane positions. In some implementations, the different derived crop residue parameter values may be displayed for an operator, wherein the operator may make additional or alternative manual adjustments to the harvester itself during harvesting.

The crop residue parameter for which values may be derived include, but are not limited to, at least one of chop size, crop residue moisture, crop residue constituents and crop residue dispersion. In one implementation, the values may be derived by the analytical unit optically identifying individual pieces of crop residue and determining values for the individual pieces of crop residue. For example, the analytical unit may measure a length of each of the pieces of crop residue, wherein the value of the crop residue parameter may be based upon a count of the number of pieces having each of a plurality of lengths. The values may be numerical values or may be a categorization based upon the numerical values. In some implementations, the value of the crop residue parameter may comprise a crop residue parameter category, wherein the analytical unit comprises a neural network that derives the category for the crop residue parameter by comparing the image to a plurality of other images having assigned categories.

In some implementations, the analytical unit may derive different values for the crop residue parameter across a width of a row of discharged crop residue and/or along the length of the discharged row of crop residue across the field. Such information may be linked to geo-referenced data (acquired through a geo-referencing system such as global positioning satellite (GPS) based geo-referencing system) to form a crop residue field map that may be used for adjusting subsequent field operations. For example, a first portion of a width of a row of discharge crop residue may have a first derived value for a particular crop residue parameter while a second portion of the width of the row of discharge crop residue may have a second derived value for the particular crop residue parameter different than the first derived value. Likewise, the row or widthwise portions of the row discharged at a first geo-referenced location at a first point in time may have a first derived value for the particular crop residue parameter whereas the row or widthwise portions of the row discharged at a second geo-referenced location (downstream or down field from the first geo-referenced location) at a second later point in time may have a second derived value for the particular crop residue parameter. By deriving different geo-referenced crop residue parameter values across the width of a row of discharged crop residue, field operations may be adjusted based upon information having a higher degree of resolution. By deriving different geo-referenced crop residue parameter values along different portions of the length of a row of crop residue, at different points in time as a harvester traverses a field, subsequent field operations may be adjusted to accommodate changing conditions as a harvester moves across a field.

FIG. 1 schematically illustrates portions of an example crop residue monitoring system 10. Crop residue monitoring system 10 utilizes a camera to capture an image of the crop residue generated by the harvester. An analytical unit than derives a value for the crop residue parameter of the crop residue based upon an optical analysis of the image. A control unit utilizes the value of the crop residue parameter to adjust a subsequent field operation. As a result, the subsequent field operations may be more attuned to the current crop residue conditions. As shown by FIG. 1, system 10 comprises harvester 22, camera 24, analytical unit 26 and control unit 50.

Harvester 22 comprise an agricultural machine that separates crop plants from the growing medium and that further processes the crop plants to separate the targeted portion of the crop plant, such as grain, from unwanted portions of the crop plant, such as straw, chaff or other crop residue. In one implementation, harvester 22 comprises a combine harvester that separates grain, such as corn, wheat, oats or the like from the remaining crop residue 53 using a threshing mechanism and a cleaning mechanism. The threshing mechanism may comprise a straw walker or threshing rotor. The cleaning mechanism may comprise a chaffer or sieve through which the grain falls and from which the crop residue, such as straw are chaff, is blown rearwardly for discharge and spreading. In some implementations, harvester may additionally include a chopper which chops the crop residue prior to his discharge.

Camera 24 captures images of the crop residue 53 generated by harvester 22. In one implementation, camera 24 capture the image of the crop after it has been discharged and spread by harvester 22. In such an implementation, camera 10 4B provided by a satellite, drone, tillage machine or other platform distinct from the harvester generating the crop residue. In some implementations, the camera 24 used to capture the image of the crop residue 53, prior to discharge or after discharge from the harvester, is carried by the harvester 22 itself. In one implementation, the camera 24 is supported so as to capture images of the crop residue prior to discharge of the crop residue from the harvester. For example, in some implementations, the camera 24 may be located so as to capture images of the crop residue as it is being blown from a sieve or chaffer towards a rear residue spreader of the harvester. In some implementations, camera 24 may be located so as to capture images of the crop residue as it is being directed from a straw walker or threshing rotor towards a rear residue spreader of the harvester. In some implementations, the camera 24 may be located such to capture images of the crop residue after the crop residue has undergone chopping, but before the chopped crop residue has been spread by the rear residue spreader of the harvester. In yet other implementations, camera 24 may be located so as capture images of the crop residue after the crop residue has been discharged. In some implementations, multiple cameras 24 may be utilized to capture images of the crop residue at more than one of the above described stages.

Analytical unit 26 comprises a processing unit that follows instructions contained on a non-transitory computer-readable or machine-readable medium. Analytical unit 26 receives the captured image 55 from camera 24 and derives a value 57 for a crop residue (CR) parameter of the crop residue based upon an optical analysis of the image. The crop residue parameter for which a value 57 may be derived include, but are not limited to, at least one of chop size, crop residue moisture, crop residue constituents and crop residue dispersion. In one implementation, the values may be derived by the analytical unit optically identifying individual pieces of crop residue and determining values for the individual pieces of crop residue. For example, the analytical unit may measure a length of each of the pieces of crop residue, wherein the value of the crop residue parameter may be based upon a count of the number of pieces having each of a plurality of lengths. In some implementations, the value of the crop residue parameter may comprise a crop residue parameter category, wherein the analytical unit comprising neural network that derives the category for the crop residue parameter by comparing the image to a plurality of other images having assigned categories.

In some implementations, the analytical unit 26 may derive different values for the crop residue parameter across a width of a row of discharged crop residue and/or along the length of the discharged row of crop residue across the field. Such information may be linked to geo-referenced data (acquired through a geo-referencing system such as GPS based geo-referencing system) to form a crop residue field map that may be used for adjusting subsequent field operations. For example, a first portion of a width of a row of discharge crop residue may have a first derived value for a particular crop residue parameter while a second portion of the width of the row of discharge crop residue may have a second derived value for the particular crop residue parameter different than the first derived value. Likewise, the row or widthwise portions of the row discharged at a first geo-referenced location at a first point in time may have a first derived value for the particular crop residue parameter whereas the row or widthwise portions of the row discharged at a second geo-referenced location (downstream or down field from the first geo-referenced location) at a second later point in time may have a second derived value for the particular crop residue parameter. By deriving different geo-referenced crop residue parameter values across the width of a row of discharged crop residue, field operations may be adjusted based upon information having a higher degree of resolution. By deriving different geo-referenced crop residue parameter values along different portions of the length of a row of crop residue, at different points in time as a harvester traverses a field, subsequent field operations may be adjusted to accommodate changing conditions even as a harvester moves across a field.

Control unit 50 comprises a processing unit that follows instructions contained on a non-transitory machine-readable medium. In one implementation, control unit 50 is part of a different agricultural machine, other than harvester 22, that carries out a subsequent field operation 59. In one implementation, the subsequent field operation 59 adjusted by the controller may comprise subsequent operations to the same geo-referenced regions by different agricultural machines other than the harvester 22. For example, subsequent tillage settings for tillage machines may be adjusted based upon the value of the crop residue parameter. Subsequent spraying or planting operations may be adjusted based upon the value of the crop residue parameter at different geo-referenced locations or regions. In some implementations, the settings of the agricultural machine having the control unit 50 may remain the same, but the parameter of a subsequent applied material may be adjusted by control unit 50 based upon the value of the crop residue parameter. For example, a type, density or other characteristic of seed, of applied herbicide, of applied insecticide, of applied fertilizer or of other applied materials may be adjusted based upon the value of the crop residue parameter.

In some implementations, control unit 50 may be part of harvester 22. Control unit 50 may adjust the operational settings of the harvester 22 itself during a subsequent harvesting season, during the same harvesting season or during the same pass of the harvester across the same field may be adjusted based upon the value of the crop residue parameter. For example, operational settings of the harvester 22 itself minutes or hours after the value for the crop residue parameter value has been derived, while harvester is traversing the same field, may be adjusted based upon the derived crop residue parameter value. Examples of such operations settings include, but are not limited to, chopper speed, chopper power, harvester speed, harvester feed rate, chopper counter knife position, header height, spreader speeds, spreader vane positions, threshing speed, cleaning speed, threshing clearance, and sieve louver positions. In some implementations, the different derived crop residue parameter values may be displayed for an operator, wherein the operator may make additional or alternative manual adjustments to the harvester itself during harvesting.

In yet other implementations, control unit 50 is a remote controller that provides control signals harvester 22 and/or the other agricultural machine. Control unit 50 utilizes the derived crop residue parameter value to output control signals adjusting a subsequent field operation. In some implementations, control unit 50, as part of harvester 22 or as a remote controller, utilize the derived crop residue parameter value output by analytical unit 26 to generate a field map linking different geo-referenced regions to different crop residue parameter values. For example, harvester 22 may carry a geo-referencing device, such as a global positioning satellite transceiver, wherein the derived crop residue parameter values received from analytical unit 26 are linked to the associated location or region of the field as provided by the geo-referencing device. The generated crop residue field map may be used as a basis for adjusting or controlling subsequent field operations to the particular geo-referenced regions.

Figure 2:
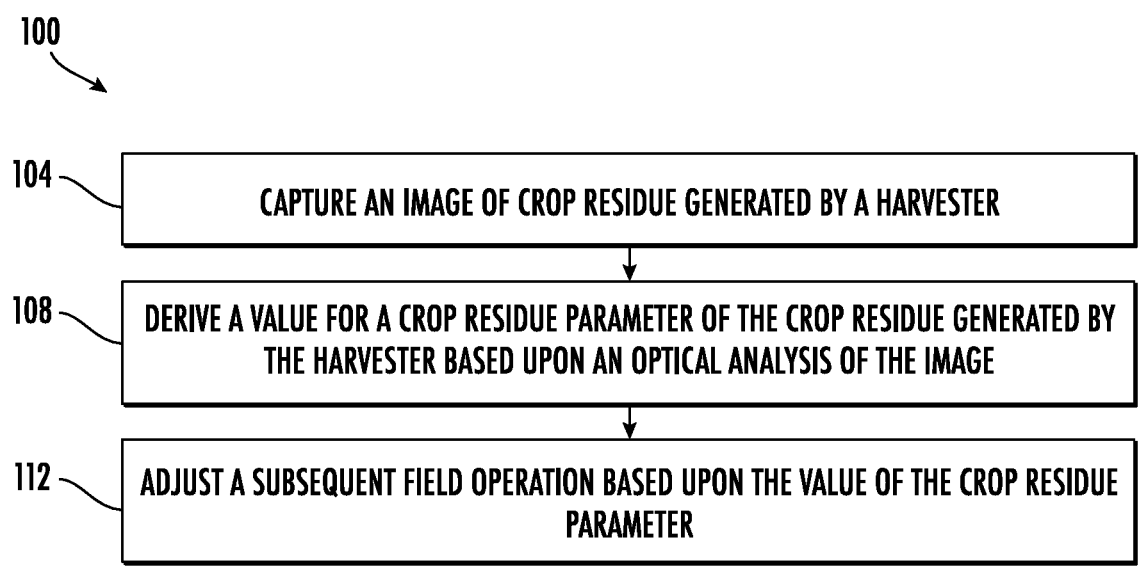
FIG. 2 is a flow diagram of an example method for monitoring crop residue and adjusting field operations based on the crop residue.

FIG. 2 is a flow diagram of an example method 100 for managing field operations using crop residue parameter values or crop residue information. Method 100 is described in the context of being carried out by system 10. However, it should be appreciated that method 100 may likewise be carried out by any of the other described implementations.

As indicated by block 104, camera 24 captures an image of crop residue 53 generated by a harvester 22. The image may be captured at a point in time before or after discharge of the crop residue by the harvester. In some implementations, camera 24 may capture images of the crop residue at multiple different locations inside of the harvester as well as outside of the harvester. The images may be captured by camera carried by the harvester, by an airborne camera or by an agricultural machine that subsequently crosses the field.

As indicated by block 108, analytical unit 26 derives a value 57 for a crop residue parameter of the crop residue generated by the harvester based upon an optical analysis of the crop residue image 55. The crop residue parameter for which values may be derived include, but are not limited to, at least one of chop size, crop residue moisture, crop residue constituents and crop residue dispersion. In one implementation, the values may be derived by the analytical unit optically identifying individual pieces of crop residue and determining values for the individual pieces of crop residue. For example, the analytical unit may measure a length of each of the pieces of crop residue, wherein the value of the crop residue parameter may be based upon a count of the number of pieces having each of a plurality of lengths. In some implementations, the value of the crop residue parameter may comprise a crop residue parameter category, wherein the analytical unit comprising neural network that derives the category for the crop residue parameter by comparing the image to a plurality of other images having assigned categories.

In one implementation the value comprises a numerical statistic such as average residue/straw length. In another implementation, the value comprises a categorization of the crop residue such as a type of crop residue, percent of different types of crop residue found in the image of the like. In another implementation, the value comprises a categorization of the crop residue in terms of processing of the crop residue such as under processed, over processed and the like, wherein the "processing" refers to the degree to which the crop residue has been changed or reduced in size by the harvester.

In implementations where the value comprises a numerical statistic, the value may be derived by optically identifying individual pieces of crop residue, individual pieces of straw, chaffer the like in measuring a characteristic of the individual pieces, such as the length of the individual pieces using optical analysis. Such identification may be carried out by applying various optical filters to the image to distinguish between individual pieces and then measuring the individual pieces using the detected edges of the individual pieces and the scale of the image being analyzed. The statistical value may be generated by counting the various pieces of a given length range or other sized range. The statistical value may be output or may be compared against a threshold, wherein a categorization of the crop residue is output based upon the comparison of the statistical value to the threshold.

In some implementations, control unit 50 may comprise a neural network. The neural network may derive a category for the crop residue parameter by comparing the image to a plurality of other images having preassigned category values. In one implementation, the preassigned category values may be developed during a training phase. The training phase may be a one time occurrence or may be repeatedly carried out in response to operator requests, in response to sensed triggering events or after predefined lapses of time or acreage traversed.

In one implementation, the training phase may comprise receiving images that have ground truth category labels. For example, persons may personally assign category labels to given images of crop residue. The neural network forming control unit 50 may then optically analyze the same images of crop residue and identify various category criteria for the different categories or labels based upon an optical analysis of the images and the ground truth category labels.

The training phase may also involve at least one verification and adjustment phase, wherein control unit 50 receives a second set of images that also have been given ground truth category labels. Control unit 50 may then apply the identifying aid category criteria to label the second images with analytical unit-based category labels. These analytical unit-based category labels may be compared against the human-based category labels to see how close the analytical unit-based category labels correspond to the human-based category labels. Based upon this comparison, the identified category criteria may be adjusted. This process may be iteratively repeated until the analytical unit-based category labels for a given set of images sufficiently match or correspond to the human-based category labels for the same set of images.

As indicated by block 112, control unit 50 may adjust a subsequent field operation based upon the values of the crop residue parameter. In one implementation, the subsequent field operations adjusted by the control unit 50 or adjusted by control unit 50 using the generated field map may comprise subsequent operations to the same geo-referenced regions by different agricultural machines other than the harvester. For example, subsequent tillage settings for tillage machines may be adjusted based upon the value of the crop residue parameter. Subsequent spraying or planting operations may be adjusted based upon the value of the crop residue parameter at different geo-referenced locations or regions.

In some implementations, the settings of the agricultural machine may remain the same, but the parameter of a subsequent applied material may be adjusted based upon the value of the crop residue parameter. For example, a type, density or other characteristic of seed, of applied herbicide, of applied insecticide, of applied fertilizer or of other applied materials may be adjusted based upon the value of the crop residue parameter.

In yet other implementations, the operational settings of the harvester itself during a subsequent harvesting season, during the same harvesting season or during traversal of the harvester across the same field may be adjusted based upon the value of the crop residue parameter. For example, operational settings of the harvester itself minutes or hours after the value for the crop residue parameter value has been derived, while harvester is traversing the same field, may be adjusted based upon the derived crop residue parameter value. Examples of such operations settings include, but are not limited to, chopper speed, chopper power, harvester speed, harvester feed rate, chopper counter knife position, header height, spreader speeds, spreader vane positions, threshing speed, cleaning speed, threshing clearance, blower speed and sieve louver positions. In some implementations, the different derived crop residue parameter values may be displayed for an operator, wherein the operator may make additional or alternative manual adjustments to the harvester itself during harvesting.

FIG. 3 is a block diagram illustrating an example controller 150 that may carry out method 100. Controller 150 serves as both analytical unit 26 and control unit 50 described above. Controller 150 comprises processing unit 152 in a non-transitory machine-readable medium 154. Processing unit 152 comprises logic circuit components they carry out instructions provided in the computer/machine-readable medium 154.

Medium 154 comprises a physical memory device, such as a hard disk drive, a flash memory, a service class memory or the like, for storing both data and instructions. Medium 154 contains analytical instructions 156 and control instructions 158. Analytical instructions 166 carry out the functions described above with respect analytical unit 26. Analytical instructions 156 direct processing unit 152 to analyze images captured by camera 24 and to derive a value for at least one crop residue parameter of the crop residue depicted in the images. Control instructions 158 carry out the functions described above with respect to control unit 50. Control instructions 158 use the at least one derived crop residue parameter value to adjust a field operation that is subsequent to the capturing of the crop residue images. Control instructions 158 may direct processing unit 162 to compare the derived values for the at least one crop residue parameter against various thresholds, wherein the comparison may result in an adjustment to an operational setting of the harvester 22, an adjustment to the operational setting of an agricultural machine other than harvester 22 crossing the same geo-referenced regions or an adjustment to the type or quantity of material applied to a field. In some implementations, the adjustment may be based upon derived crop residue parameter values found in a field map generated from the crop residue parameter values.

FIG. 4 is a flow diagram of an example method 200 for deriving a value for a crop residue parameter. Method 200 may be carried out by processing unit 152 following the analytical instructions 156 contained in medium 154. It should be appreciated that method 200 may likewise be carried out by analytical unit 26 or any of the analytical units or controllers described hereafter.

As indicated by block 204, processing unit 152, following analytical instructions 156, optically identifies individual pieces of crop residue. For example, processing unit 162 may apply various optical filters to an image 55 or otherwise detect the edges of individual pieces of crop residue depicted in an image.

As indicated by block 208, processing unit 152, following analytical instructions 156, may measure the individual pieces using the detected edges of the individual pieces and the scale of the image being analyzed. The measurements of the individual pieces may be used to generate a statistical average or other statistical value characterizing the crop residue in the image 55. In some implementations, the measurements may be compared to thresholds and the crop residue and image may be categorized in terms of processing by harvester 22, in terms of the type of crop residue or in terms of other predetermined categories.

FIG. 5 is a flow diagram of an example method 300 for deriving a value for a crop residue parameter. Method 300 may be carried out by processing unit 152 following the analytical instructions 156 contained in medium 154. It should be appreciated that method 200 may likewise be carried out by analytical unit 26 or any of the analytical units or controllers described hereafter.

Method 300 comprises a training and verification phase 302 and a use phase 304. In the training phase, a set of criteria is identified (or adjusted) for use in use phase 304. In the use phase 304, images of crop residue captured by camera 24 (described above) are analyzed using the criteria to derive a value for the particular image. The different values for multiple images may be aggregated and used for adjusting or controlling a subsequent field operation.

As indicated by block 308, controller 150 receives first images of crop residue (CR) that have been provided with ground truth category labels such as ground truthing mechanism labels or human based category labels." "Ground truth" labels refer to labels assigned by direct observation or empirical evidence as opposed to being based upon inference. "Human based" means that the images have been assigned categories or labels directly based upon visual inspection by humans. For example, persons may personally assign category labels to given images of crop residue. Ground truth labels may further include labels that have been derived from direct visual inspection. For example, reinforced learning algorithms and convolution neural nets may add to training sets that provide ground truth values. As indicated by block 312, the neural network forming control unit 50 may then optically analyze the same images of crop residue and identify various category criteria for the different categories or labels based upon an optical analysis of the images and the ground truth category labels.

The training phase may also involve at least one verification and adjustment phase. As indicated by block 316, control unit 50 receives a second set of images that also have been given ground truth category labels. Control unit 50 may then, at block 320, apply the identified category criteria to label the second images with analytical unit-based category labels. As indicated by block 324, the analytical unit-based category labels may be compared against the human-based category labels to determine how close the analytical unit-based category labels correspond to the human-based category labels. As indicated by block 328, based upon this comparison, controller 150 automatically adjusts the identified category criteria. This process outlined in block 308-328 may be iteratively repeated until the analytical unit-based category labels for a given set of images sufficiently match or correspond to the human-based category labels for the same set of images.

Following at least one training phase 302, controller 150 receives an additional image of crop residue as captured by camera 24 as the harvester is traversing a field during harvest. As indicated by block 332, controller 150 may compare identified characteristics of the third image to the identified category criteria to assign a category to the crop residue of the third image. The assigned category may be presented to an operator or may be used to trigger an adjustment to a subsequent field operation.

Figure 6:
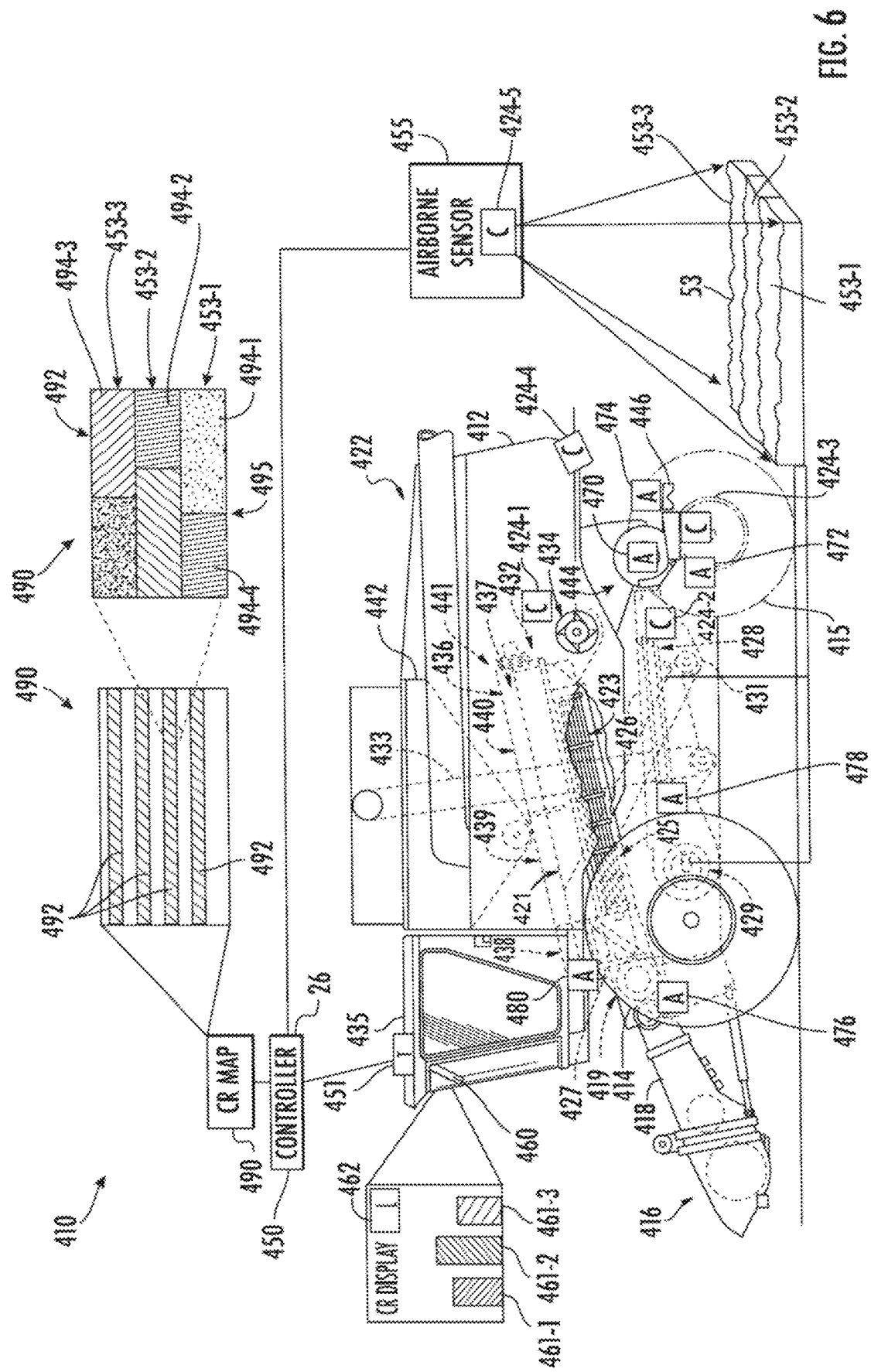
FIG. 6 is a diagram illustrating an example crop residue monitoring system including a harvester.

FIG. 6 is a schematic diagram of an example crop residue monitoring system 410. System 410 comprises combine harvester 422, cameras 424-1, 424-2, 424-3, 424-4 and 424-5 (collectively referred to as cameras 424) and controller 450. Combine harvester 422 comprises a main frame 412 having wheeled structure including front and rear ground engaging wheels 414 and 415 supporting the main frame for forward movement over a field of crop to be harvested. The front wheels 414 are driven by an electronically controlled hydrostatic transmission.

A vertically adjustable header or harvesting platform 416 is used for harvesting a crop and directing it to a feeder house 418. The feeder house 418 is pivotally connected to the frame 412 and includes a conveyor for conveying the harvested crop to a beater 419. The beater 419 directs the crop upwardly through an inlet transition section 427 to a rotary threshing assembly 421. In other implementations, other orientations and types of cleaning structures and other types of headers 416, such as transverse frame supporting individual row units, are utilized.

The rotary threshing assembly 421 threshes and separates the harvested crop material. Grain and crop residue, such as chaff, fall through a concave 425 and separation grates 423 on the bottom of the assembly 421 to a cleaning and separation system 426, and are cleaned by a chaffer and/or sieve 428 and air fan or blower 429. The blower 429 blows the lighter crop residue above the sieve 228 rearwardly for discharge. The grain passes through openings, between louvers, provided by the sieve 428. The clean grain is directed to elevator 433. Clean grain elevator 433 conveys the grain to tank 442. The clean grain in the tank 442 can be unloaded into a grain cart or truck by unloading auger. Tailings fall into the return elevator or auger 431 and are conveyed to the rotor 437 where they are threshed a second time.

Threshed and separated straw is discharged from the rotary threshing assembly 421 through an outlet 432 to a discharge beater 434. In one implementation, the discharge beater 434, in turn, propels the straw to the rotary chopper 444 which chops the straw and other residue before directing the straw and other residue to spreader 446. In some implementations where the straw is chopped by chopper 444, discharge beater 434 may be omitted or other mechanism may be used to direct the straw to rotary chopper 444. In yet other implementations, the discharge beater 434 may direct the straw to a discharge outlet above spreader 446, wherein the straw is not chopped prior to being discharged from the rear of combine harvester 422 by spreader 446. The operation of the combine is controlled from an operator's cab 435.

In the example illustrated, the rotary threshing assembly 421 comprises a cylindrical rotor housing 436 and a rotor 437 located inside the housing 436. The front part of the rotor and the rotor housing define the infeed section 438. Downstream from the infeed section 438 are the cleaning section 439, the separating section 440 and the discharge section 441. The rotor 437 in the infeed section 438 is provided with a conical rotor drum having helical infeed elements for engaging harvested crop material received from the beater 419 and inlet transition section 427.

In the cleaning section 439, the rotor 437 comprises a cylindrical rotor drum having a number of cleaning elements, sometimes called rasping bars, for cleaning the harvested crop material received from the infeed section 438. Downstream from the cleaning section 439 is the separating section 440 wherein the grain trapped in the threshed crop material is released and falls to the chaffer/sieve 428.

Cameras 424 comprise optical imaging devices that capture images of crop residue (straw, chaff and other non-targeted portions of a crop plant or portions of harvested weeds) at various stages or times both prior to and following discharge of the crop residue from harvester 422. Camera 424-1 captures images of crop residue moving between outlet 432 and chopper 444, upstream of spreader 446. In one implementation, camera 424-1 is supported by frame 412 so as to be focused on a region within the harvester 422 between beater 434 and chopper 444.

Camera 424-2 is supported by frame 412 so as to be focused on interior regions of harvester 422 so as to capture images of crop residue being blown from chaffer/sieve 428 towards chopper 444 and toward spreader 446.

Figure 7:
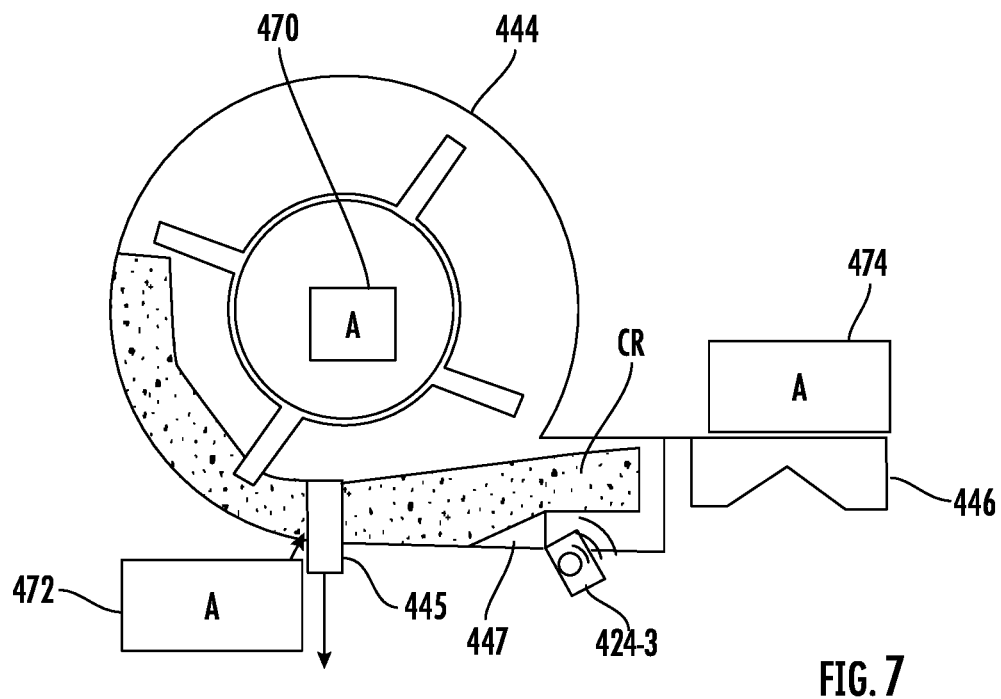
FIG. 7 is an enlarged view of an example camera mount for the harvester of FIG. 6.
Figure 8:
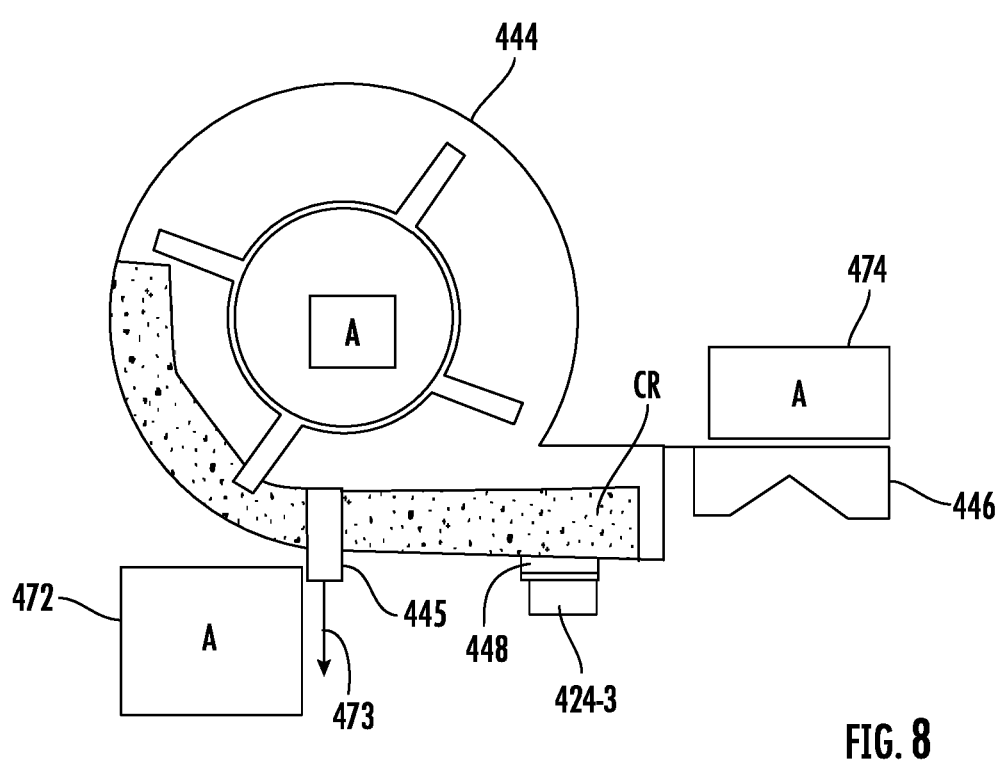
FIG. 8 is an enlarged view of another example camera mount for the harvester of FIG. 6.

Camera 424-3 is supported by frame 412 so as to focused on interior regions of harvester 422 between chopper 444 and spreader 446. Camera 424-3 captures images of crop residue after its been chopped by chopper 444 and prior to being discharged and spread by spreader 446. FIG. 7 is an enlarged view illustrating one specific example for the positioning of camera 424-3. As shown by FIG. 7, camera 424-3 may be supported between chopper 444 and spreader 446 downstream a deflector 447. Deflector 447 comprises a ramp or other structure that directs the flow of crop residue over and above camera 424-3, reducing direct impacts with the camera and protecting camera 424-3 from the potentially camera damaging flow of crop residue CR. FIG. 8 illustrates an alternative implementation which camera 424-3 is positioned below a transparent removable and replaceable protective panel 448. Images from camera 424-3 may indicate cracks or other damage to camera 424-3, providing notice for replacing the panel 448. Panel 448 protects camera 424-3 from the flow of crop residue CR as it is being directed to spreader 446.

Camera 424-4 is mounted to frame 412 at a rear of harvester 422. Camera 424-4 supported so as to be focused on the crop residue CR that is been discharged onto the ground. In addition to providing an image depicting the constitution of crop residue 42, camera 424-4 provides an image that may be used to determine the characteristics of the spread of crop residue on the ground. In the example illustrated, crop residue 53 is spread by spreader 446 in a row tailing from harvester 422 as harvester 422 traverses a field. As will be described hereafter, images produced by camera 424-4 may be used by controller 450 to identify the density of different widthwise portions of the row as well as to identify the different constituents and different values for crop residue parameters for each of multiple widthwise portions of the row, for example widthwise portions 453-1, 453-2, and 453-3.

Camera 424-5 is similar to camera 424-4 except that camera 424-5 is part of an airborne sensor 455. The airborne sensor 455 may be in the form of a satellite, a drone, an airplane or other airborne vehicle or platform. Airborne sensor 455 may capture images of crop residue 53 after it has been discharged or spread upon the ground trailing the path of harvester 422 as a harvester 422 crosses the field.

Controller 450 may be in the form of controller 150 described above. In one implementation, controller 450 is part of harvester 422. In yet another implementation, controller 450 is a remote controller that communicates in a wireless fashion to an onboard controller of harvester 422 using a transceiver 451 (T) carried by harvester 422.

Controller 450 carries out both image analysis and control operations. Controller 450 receives signals from each of the cameras 424 representing the captured images of the crop residue at the different locations. The analytical unit derives values for different crop residue parameters of the crop residue. In one implementation, controller 450 may analyze the captured images pursuant to method 200 described above. In another implementation, controller 450 may analyze captured images pursuant to method 300 described above.

Controller 450 further uses the derived values to present information to an operator regarding the crop residue. Controller 450 outputs control signals to a display 460 within cab 435 or at a remote operator control station. Controller 450 may present the derived statistical values for at least one parameter of the crop residue. For example, controller 450 may present data regarding parameters such as crop residue moisture, average crop residue length, percentage of different crop residue types present in the crop residue. In some implementations, controller 450 may present the derived at each of the different locations or stages. For example, controller 450 may present on display 460 a first set of values for different crop residue parameters derived from images captured by camera 424-1, a second different set of values for the crop residue parameters derived from images captured by camera 424-2, a third different set of values for the crop residue parameters derived from images captured by camera 424-3, the fourth set of values for the crop residue parameters derived from images captured by camera 424-4 and a fifth different set of values for the crop residue parameters derived from images captured by camera 424-5. The different values presented to the operator may indicate the state of the crop residue at different locations as it passes through and his discharge from harvester 422. Such information may be utilized to evaluate the performance of various components of harvester 422.

In some implementations, the values for different parameters associated with the crop residue may be derived from an aggregation of values derived from images from multiple cameras 424. In other words, the values may be generated using the images from all of cameras 424 or more than one camera 424. In such an implementation, controller 450 may receive input from an operator indicating which cameras 424 are to provide the images that are used for deriving the crop residue parameter values. In one implementation, controller 450 may further receive input from an operator assigning a predefined weight to each camera, the degree to which the values derived from each camera contribute to the overall value for a particular crop residue parameter. For example, for a first parameter, the predefined weights assigned to the different cameras may result in the individual values from camera 424-3 having a larger impact or effect on the aggregate value for the first parameter as compared to the individual values from a different camera, such as camera 424-2.

As further shown by FIG. 6, the different values for the different parameters may be determined for individual widthwise portions of the overall trailing row of crop residue discharged from harvester of 422. These different values may be presented on display 460. In the example illustrated, controller 450 outputs signals causing display 460 present a graph having a first bar 461-1 displaying the derived values for a crop parameter for widthwise portion 453-1, a second bar 461-2 displaying derived values for the crop residue parameter for widthwise portion 453-2 and a third bar 461-3 displaying derived values for the crop residue parameter for widthwise 453-3 of the discharged row of crop residue. Such values may represent the density or mass for each of the different widthwise portions as derived from images captured by camera 424-4 and/or 424-5. Such values may also identify the moisture, degree of chop or length of straw/residue for the different widthwise portions 453. The different parameters represented by the example bar graph may be reflected by an appropriate legend 462.

In addition to displaying or presenting the individual parameter values for crop residue from each of the cameras and a category, score or other value derived from an aggregation of values from multiple cameras 424, controller 450 may compare such values against various thresholds to trigger the adjustment of the operational settings of harvester 422. Such adjustments may dynamically occur in real time as a harvester 422 is crossing a field. In one implementation, based on a comparison of the value against various predetermined thresholds, controller 450 may output control signals to an actuator 470 (such as a hydraulic or electric motor) so as to adjust the speed of chopper 444 or the power of chopper 444. Based upon such comparison, controller 450 may additionally or alternatively output control signals to actuator 472 (such as a hydraulic cylinder or a solenoid) to adjust the position of the chopper counter knife 445 as indicated by arrow 473, wherein the positioning affects the degree to which the residue is chopped by chopper 444. Based upon such comparison, control unit 50 may additionally or alternatively output control signals to actuator 474 (such as a hydraulic or electric motor) to adjust the speed of spreader 446 or the positioning of its vanes. Based upon such comparison, controller 450 may additionally or alternatively output control signals to actuator 476 adjusting the header height, may output control signals to actuator 478 or actuator 480 adjusting a threshing speed, separation speed, threshing clearance or sieve louver positions. Based upon such comparison, controller 450 may additionally or alternatively output control signals adjusting the speed of harvester 422 crossing a field or the rate at which crops are fed through harvester 422 by the various augers, conveyors and components of harvester 422.

As further shown by FIG. 6, in some implementations, controller 450 may utilize the derived values for the different crop residue parameters to generate a crop residue field map 490 which may be stored for subsequent use. The field map 490 may be utilized during subsequent harvesting operations or for other field operations by agricultural machines or equipment other than harvester 422. For example, the field map 490 may be utilized to adjust the operational settings of tillage equipment or applicators that apply herbicide, insecticide or fertilizer. The field map may be utilized to adjust the operational settings of a planter as a planter is traversing a field.

Controller 450 may generate field map 490 based upon geo-referencing signals that indicate the location of harvester 422 as it is traversing a field. In one implementation, controller 450 may receive signals from a global positioning satellite or system that indicates the particular location of harvester 422 as harvester 422 traverses the field. This geo-referencing data may be linked to the associated values for the different derived crop residue parameters. As shown by FIG. 6, the resulting crop residue map 490 may represent a series of crop residue rows 492, each row 492 having particular geo-referenced locations and associated with the particular crop residue parameter values derived from images captured when harvester 422 was processing or discharging crop residue at the particular geo-referenced location.

As further shown by FIG. 6, each geo-referenced row 492 and map 490 may have a widthwise resolution less than the width of the row 492. In the example illustrated, each row 492 in map 490 may depict different values for an individual crop residue parameter for different individual widthwise regions or portions 453. Such values may change along the length of each row 492 as a harvester 422 is crossing a field. In the example illustrated, widthwise portion 453-1 is depicted in field map 490 as having a first value or category 494-1 for a particular parameter, widthwise portion 453-2 is depicted in field map 490 as having a second different value 494-2 for the parameter and widthwise portion 453-3 in field map 490 is depicted in field map 490 is having a third different value 494-3 for the particular crop residue parameter. Such values 494 change along the length of row 492. For example, the value for the particular parameter for region 453-1 changes from value 494-1 to value 494-4 at geo-referenced location 495.

The different values for the crop residue parameter at the different geo-referenced locations may be utilized to adjust operational subsequent field operations. For example, based upon the data contained in field map 490, a tillage implement may operate at a first operational setting in a first geo-referenced location in the field may switch to a second different operational setting for a second geo-referenced location the field based upon changes in the values for the crop residue parameter. A planter may plant seeds at a first depth at a first geo-referenced location in the field and at a second different depth at a second geo-referenced location in the field based upon differences between the value of the crop residue parameter at the first geo-referenced location and the second geo-referenced location. A sprayer or other material applicator may apply herbicide, insecticide and/or fertilizer at a first rate at a first geo-referenced location in a field and a second different rate at a second geo-referenced location the field based upon differences between the value of the crop residue parameter at the first geo-referenced location and the second geo-referenced location. Different herbicides, insecticides and sensor fertilizers may be applied at the first geo-referenced location in the field as compared to the second geo-referenced location in the field based upon differences between the value of the crop residue parameter at the first geo-referenced location and the second geo-referenced location.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A crop residue monitoring system comprising:
a harvester comprising a frame, a chopper and a spreader, the harvester configured to separate a first portion of a crop plant from a second portion thereof, wherein the chopper is configured to chop the first portion of the crop plant into crop residue and direct a flow of the crop residue toward the spreader;
a camera coupled to the frame and located downstream of the chopper, the camera configured to capture an image of the flow of crop residue in a cavity; and
a structure located in the cavity along the flow of crop residue, wherein the structure is a deflector configured to deflect the flow of crop residue in the cavity over and above the camera to separate the flow of crop residue from the camera as the crop residue flows over the camera.

2. The system of claim 1 wherein the camera is located downstream of the structure and between the chopper and the spreader.

3. The system of claim 1, wherein:
the harvester defines an interior region between the chopper and the spreader;
wherein the camera is configured to be focused on the interior region of the harvester.

4. The system of claim 1, wherein the structure comprises a deflector configured to deflect the flow of crop residue away from the camera.

5. The system of claim 4, wherein the deflector comprises a ramp.

6. The system of claim 1, wherein the chopper defines the cavity configured to direct the flow of crop residue.

7. The system of claim 1, the camera being adjacent to the deflector such that the deflector is positioned between the camera and the flow of crop residue.

8. The system of claim 7, wherein the deflector is inclined relative to an adjacent upstream portion of the cavity to deflect the crop residue in the cavity over and above the camera.

9. The system of claim 1, further comprising:
a controller configured to derive a crop residue parameter of the crop residue based upon an analysis of the image; and
a controller configured to adjust a subsequent field operation based upon a value of the crop residue parameter.

10. The system of claim 9, wherein the controller derives the crop residue parameter by:
optically identifying individual pieces of crop residue based upon the analysis of the image; and
identifying a length of pieces of the crop residue, the crop residue parameter being based upon a count of a number of the pieces having each of a plurality of lengths.

11. The system of claim 10 wherein the controller comprises a neural network, wherein the neural network derives category criteria for the crop residue parameter.

12. The system of claim 11 wherein the camera captures an additional image of the crop residue and compares identified characteristics of the additional image to the category criteria to trigger an adjustment to the subsequent field operation.

13. A method for harvesting a crop plant comprising:
separating a first portion of the crop plant from a second portion thereof;
forming crop residue from the first portion of the crop plant;
directing a flow of the crop residue in a cavity away from a chopper toward a spreader;
deflecting, by a deflector, the flow of crop material in the cavity over and above a camera to protect the camera from the flow of crop residue, the deflector positioned along the flow of the crop residue in the cavity and located between the chopper and the spreader;
imaging the flow of crop residue with the camera, wherein the camera captures an image of the flow of crop residue;
analyzing the captured image to derive a crop residue parameter of the crop residue; and
adjusting a harvesting operation of a harvester based on the derived crop residue parameter.

14. The method of claim 13, further comprising supporting the camera on the harvester between the chopper and the spreader.

15. The method of claim 14, further comprising focusing the camera on an interior region of the harvester located between the chopper and the spreader.

16. The method of claim 13, wherein deflecting the flow of crop residue comprises directing the flow of crop residue away from the camera with the deflector.

17. The method of claim 13, wherein the deflector comprises a ramp that is inclined relative to an adjacent upstream portion of the cavity and configured to direct the flow of crop residue away from the camera.

18. The method of claim 13, further comprising protecting the camera from the flow of crop residue via the deflector.

19. The method of claim 18, wherein the deflector is configured to alter an elevation of the flow of the crop residue within the cavity.

20. The method of claim 13, adjusting a harvesting operation of the harvester based on the derived crop residue parameter comprises one of adjusting a speed of the chopper or adjusting a position of a chopper counter knife.

* * * * *